(12) United States Patent
Qian et al.

(10) Patent No.: US 6,417,629 B1
(45) Date of Patent: Jul. 9, 2002

(54) PUSH-PULL BASED VOLTAGE-CLAMPING ELECTRONIC BALLAST

(75) Inventors: Jinrong Qian, Croton-On Hudson; DaFeng Weng, Yorktown Heights, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/730,619

(22) Filed: Dec. 6, 2000

(51) Int. Cl.$^7$ ............................................... H05B 37/00
(52) U.S. Cl. ........................ 315/219; 315/224; 315/276
(58) Field of Search ................................. 315/224, 219, 315/291, 276, 277

(56) References Cited

U.S. PATENT DOCUMENTS 6,078,144 A * 6/2000 Twardzik ................ 315/209 R
6,140,779 A * 10/2000 Kanazawa et al. .......... 315/291

* cited by examiner

Primary Examiner—David Vu

(57) ABSTRACT

An electronic ballast that includes a DC power source and a transformer comprising first, second and third windings. The first, second and third windings being inductively coupled, and the third winding is connected in parallel with a load. The ballast also includes first and second circuit pathways connected in parallel. The first circuit pathway comprises a first switch connected in series with the first winding, and the second circuit pathway comprises the second winding connected in series with a second switch. The DC power source is connected in parallel with the first and second circuit paths to provide an input voltage source. A capacitor connects the point between the first switch and first winding of the first circuit pathway with the point between the second switch and the second winding of the second circuit pathway.

9 Claims, 4 Drawing Sheets

PUSH-PULL BASED VOLTAGE-CLAMPING ELECTRONIC BALLAST

BACKGROUND OF THE INVENTION

1. Field of the Invention

The present invention relates to electronic ballasts, and more particularly to electronic ballasts that clamp a voltage across a switch and recycle leakage energy of a transformer such that a power converter has high power conversion efficiency with no voltage spike in the switch.

2. Description of the Related Art

Traditional ballasts for use in fluorescent lamps consisted of large and heavy magnetic coils. These have been replaced by electronic ballasts that are compact and light. A common device used as an electronic ballast is a self-oscillating, push-pull converter. One well-known push-pull converter is shown in FIG. 1. As shown in FIG. 1, the converter consists of a DC power source $V_{in}$, switches $S_1$ and $S_2$, and transformer T. The switches $S_1$ and $S_2$ are each a standard metal-oxide semiconductor, field-effect transistor (MOSFET). $D_{s1}$ and $C_{s1}$ represent body diode and internal capacitance, respectively, of switch $S_1$, and $D_{s2}$ and $C_{s2}$ represent body diode and internal capacitance, respectively, of switch $S_2$. Transformer T contains three windings, N1, N2 and N3, and is designed such that a current present in either winding N1 or N2 produces a current in winding N3 to drive the load Ro, typically a fluorescent lamp. Inductor $L_r$ and capacitor $C_r$ form a standard resonant tank to provide high frequency voltage to the load Ro. Three current paths flowing in the circuit are represented as having currents $i_{s1}$, $i_{s2}$ and $i_{Lr}$. Voltage $V_0$ is shown across load Ro.

FIG. 2 is a graph of the waveforms associated with the conventional push-pull electronic ballast circuit of FIG. 1. As shown in FIG. 2 and also found in other like electronic ballasts is a phenomenon of overvoltage or high voltage spikes that occur across the switches when the device is switched off. For example, at $t_0$ when $S_1$ is switched off a spike is shown in FIG. 2 to occur in the voltage across $S_1$, i.e. $V_{ds1}$. The principle reason for the voltage spike is that the opening of switch $S_1$ creates an abrupt interruption (discontinuity) in the current through $N_1$. There is an release of stored energy due to a leakage inductance associated with winding $N_1$ (represented as $L_{k1}$ in FIG. 1), thereby inducing a current that charges $C_{s1}$ and consequently creating a high voltage spike across switch $S_1$.

The same voltage spike characteristic occurs in the voltage across $S_2$, i.e. $V_{ds2}$, at time $t_2$ when $S_2$ is switched off. The voltage spike is caused by transient or leakage inductance $L_{k2}$ associated with transformer winding $N_2$. The circuit of FIG. 1 provides no avenue for the released energy of the winding to flow other than the internal capacitance of the adjacent switch, which results in the voltage spike. In the prior art the leakage inductances are always present to some extent and there is always a danger of inducing these high voltage transients when switching off. The faster the switching the greater the voltage spikes. An excessive voltage spike will result in permanent damage to the switching device such as a burn through of the semiconductor layers.

One method of reducing the voltage spikes is to include a "snubber" circuit comprised of an additional diode, capacitor and resistor, connected in parallel with the switch (such as S1 and S2). While the snubber circuit can limit the peak voltage of the spike, it slows down the effective switching speed of the circuit, and in doing so it absorbs energy that is dissipated as heat, thus reducing the overall power conversion efficiency of the ballast.

Another method of reducing the voltage spikes is to "clamp" the voltage across the switch (such as S1 and S2). This is accomplished by two conventional methods. A first method connects a zener diode across the switch. As the voltage spike occurs the Zener diode turns on allowing the current to flow through, thus reducing or eliminating the voltage spike across the switch. A second method connects a diode in series with a with a parallel capacitor and resistor network across the switch. The capacitor charges to a constant voltage through a current flow, thus absorbing the voltage spikes. The resistor dissipates the stray inductances while maintaining the voltage across the capacitor. As with any clamping circuit, stray circuit inductances exist, and voltage spikes will be produced. Also, a diode by its nature does not provide an instantaneous clamping action.

SUMMARY OF THE INVENTION

It is therefore an aspect of the present invention to provide an electronic ballast that clamps the voltage across the main switch and eliminates voltage spikes due to the leakage inductance of the transformer.

It is another aspect of the present invention to provide an electronic ballast that recycles the leakage energy of the transformer to improve the power consumption efficiency of the circuit.

These and other aspects of the present invention are achieved by providing an electronic ballast that incorporates a clamping capacitor therein in such a manner that the overall circuit eliminates voltage spikes across the switches and recycles the transient leakage inductances of the transformer.

Thus, the invention comprises an electronic ballast that includes a DC power source and a transformer comprising first, second and third windings. The first, second and third windings being inductively coupled, and the third winding is connected in parallel with a load. The ballast also includes first and second circuit pathways connected in parallel. The first circuit pathway comprises a first switch connected in series with the first winding, and the second circuit pathway comprises the second winding connected in series with a second switch. The DC power source is connected in parallel with the first and second circuit paths to provide an input voltage source. A capacitor connects the point between the first switch and first winding of the first circuit pathway with the point between the second switch and the second winding of the second circuit pathway.

The first and second switches may be transistors, for example, metal-oxide semiconductor field-effect transistors. The first switch and the second switch are electrically connected to a digital controller or some other switching source that provides switching signals to the first and second switches. The first and second switches are switched off and on in a repeating cycle, the first switch switched on while the second switch is switched off and the first switch switched off while the second switch is switched on. When the first switch is switched off, a current in the first winding provides a charging of the capacitor. Likewise, when the second switch is switched off, a current in the second winding provides a charging of the capacitor. The voltage across the first and second switches is substantially constant over the interval that the respective switch is turned off.

BRIEF DESCRIPTION OF THE DRAWINGS

The above and other aspects, features and advantages of the present invention will become more apparent from the following detailed description when taken in conjunction with the accompanying drawings in which:

FIG. 5 is a circuit diagram representing the circuit of FIG. 3 when switch S1 is on; and FIG. 6 is a circuit diagram representing the circuit of FIG. 3 when switch S2 is on.

DETAILED DESCRIPTION OF INVENTION

Preferred embodiments of the present invention will be described herein below with reference to the accompanying drawings. In the following description, well-known functions or constructions are not described in detail since they would obscure the invention in unnecessary detail.

Figure 1:
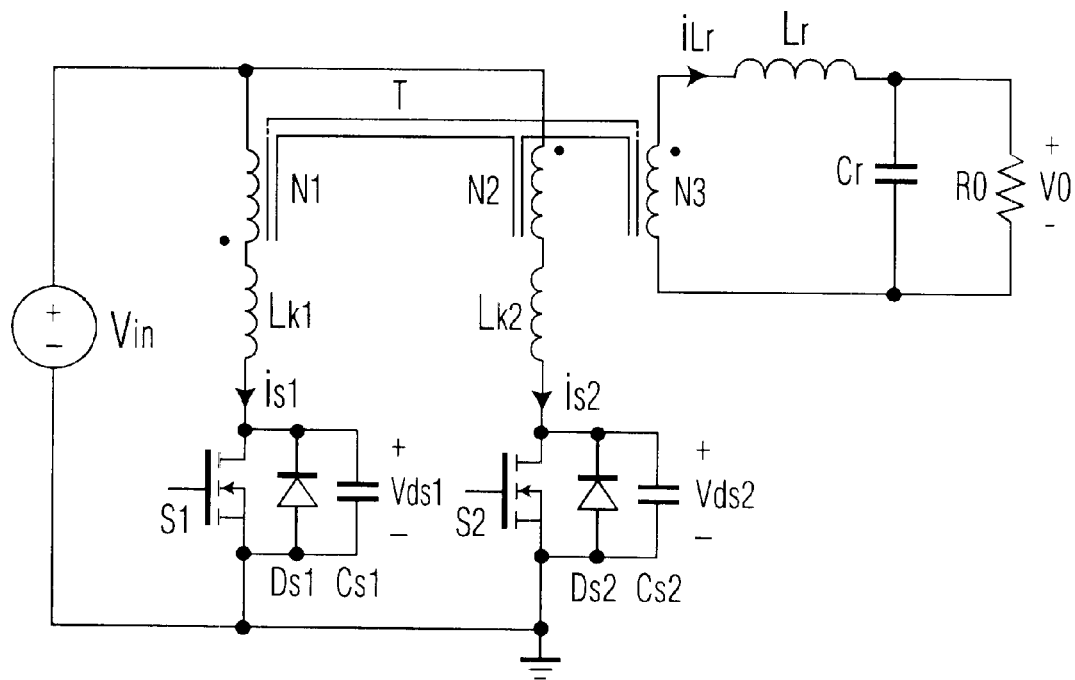
FIG. 1 is a circuit diagram of a conventional push-pull electronic ballast.
Figure 2:
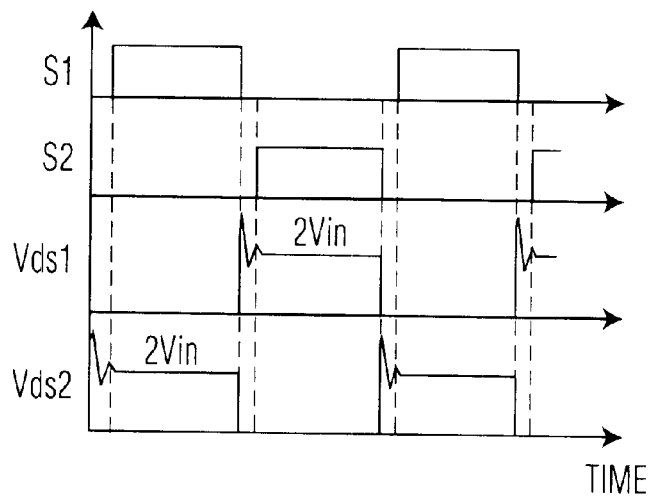
FIG. 2 is a graph of typical switching waveforms of the circuit of FIG. 1.
Figure 3:
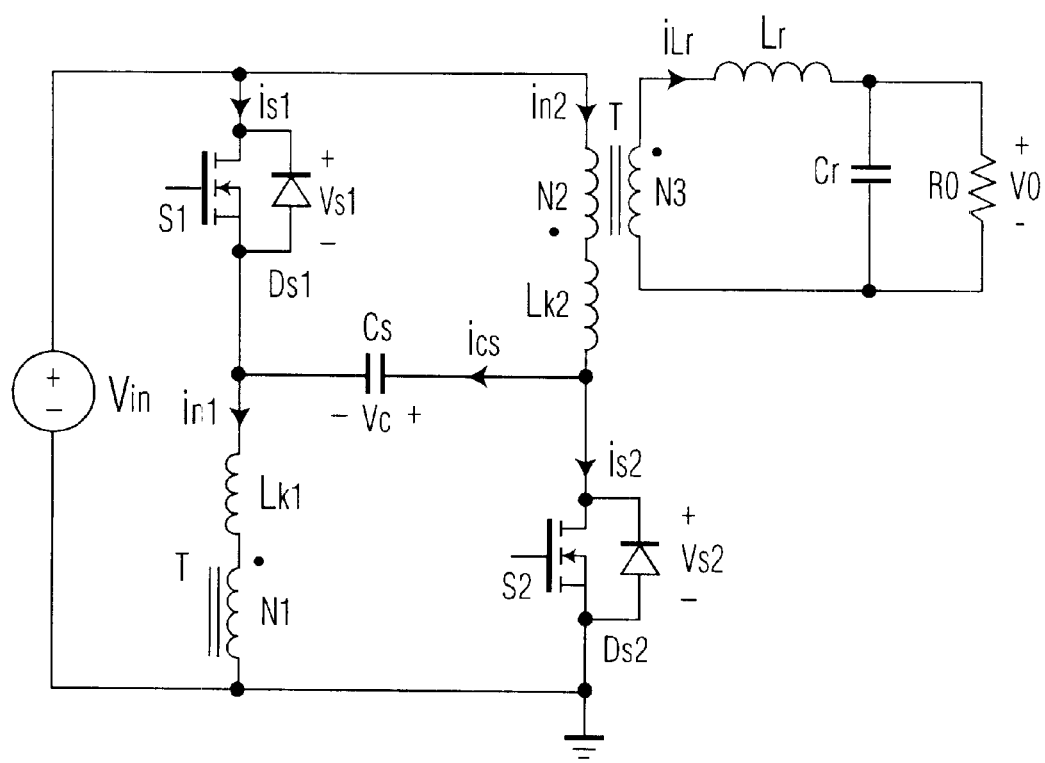
FIG. 3 is a circuit diagram of a push-pull based voltage clamping electronic ballast according to an embodiment of the present invention.

FIG. 3 is a circuit diagram of a preferred embodiment of the present invention. A DC power source $V_{in}$ supplies DC power to the circuit. $L_{k1}$ and $L_{k2}$ represent the leakage inductances of windings $N_1$, $N_2$ of transformer T. $D_{s1}$ represents body diode of switch $S_1$. $D_{s2}$ represents body diode of switch $S_2$. $C_s$ is a clamping capacitor that, as described further below, acts to absorb and recycle leakage energy of transformer T. Transformer T has three coupled windings, primary windings $N_1$ and $N_2$ and secondary winding $N_3$. In the preferred embodiment, the number of windings of $N_1$ is equal to the number of windings of $N_2$. The normal current paths through switches $S_1$ and $S_2$ and windings $N_1$ and $N_2$ are represented by $i_{s1}$, $i_{s2}$, $i_{n1}$ and $i_{n2}$, respectively, having the sign conventions as shown. The voltages across switches $S_1$ and $S_2$ and capacitor $C_s$ are represented by $V_{s1}$, $V_{s2}$, and $V_c$, respectively, having the sign conventions as shown. Inductor $L_r$ and capacitor $C_r$ form a resonant tank and resonant tank current $i_{Lr}$ induced in $N_3$, provides a high frequency voltage $V_0$ across the load $R_0$, i.e. a fluorescent lamp. The operation of FIG. 3 will be described with reference to FIG. 4.

Figure 4:
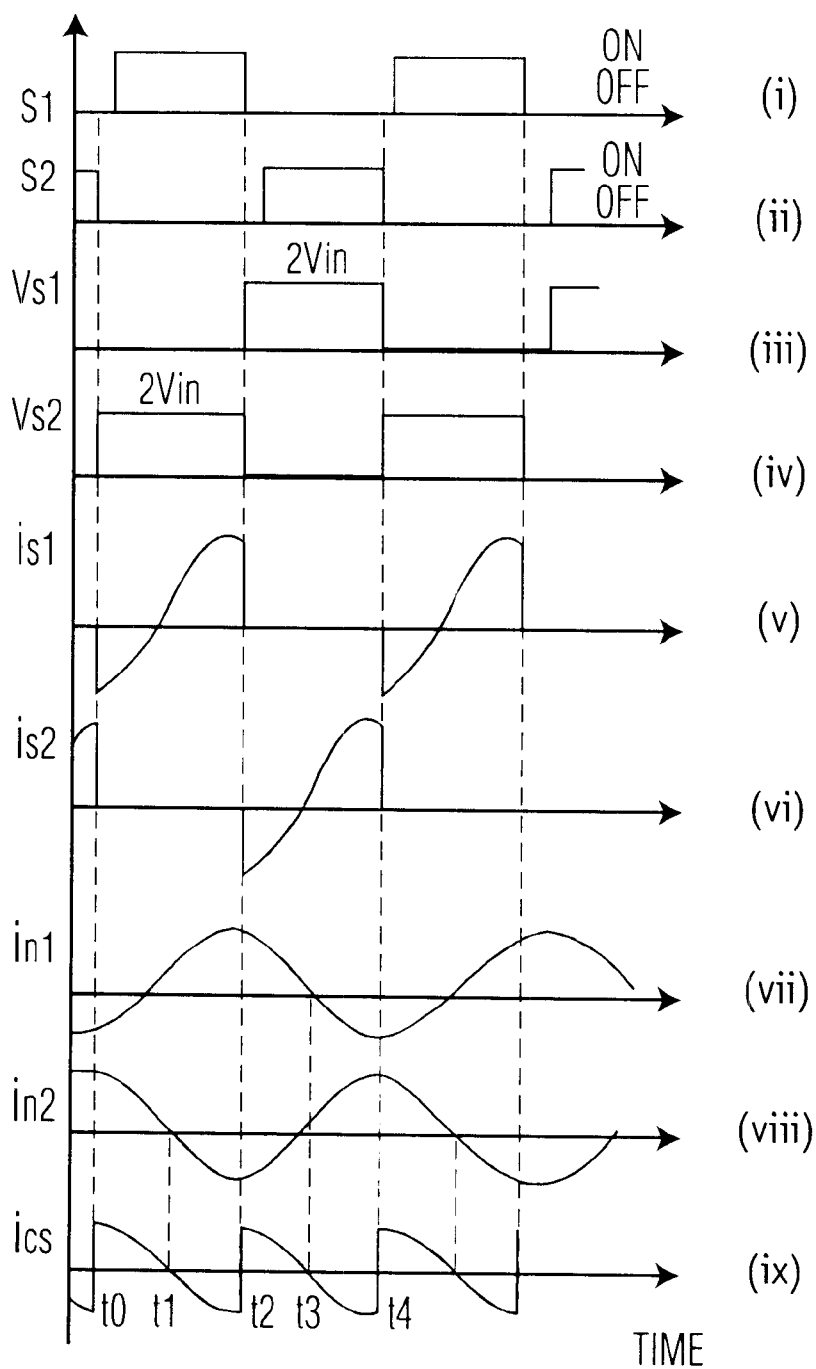
FIG. 4 is a graph of switching waveforms of the circuit of FIG. 3.

FIG. 4 is a graph of the various waveforms associated with the switching of the circuit of FIG. 3 during a steady state switching. Waveforms i and ii give the relative switching cycles of $S_1$ and $S_2$, respectively. Just prior to $t_0$, switch $S_2$ is conducting and carries its maximum current (see waveform vi) at $t_0$, which is equal to $i_{n2}-i_{n1}$. Since switch $S_2$ has been on for the duration of a switching cycle at $t_0$, the current $i_{n2}$ through $N_2$ due to $V_{in}$ has increased to a maximum (see waveform viii), while capacitor $C_s$ is discharging a voltage (described further below), thus creating a negative current $i_{n1}$ (see waveform vii). By the sign convention of $i_{n1}$ shown in FIG. 3, both of these currents add to $i_{s2}$.

During the time period $t_0$ to $t_2$, switch $S_1$ is conducting or on and switch $S_2$ is off. During $t_2$ to $t_4$ switch $S_2$ is on and switch $S_1$ is off (see waveforms i and ii of FIG. 4). It is noted that a switch is also considered "on" where the associated body diode is conducting. Thus, for example, waveform v at $t_0$ shows that $i_{s1}$ has a negative value even though waveform i shows that switch $S_1$ remains off for a brief period after $t_0$. The negative current flow in this interval is through $D_{s1}$.

Figure 5:
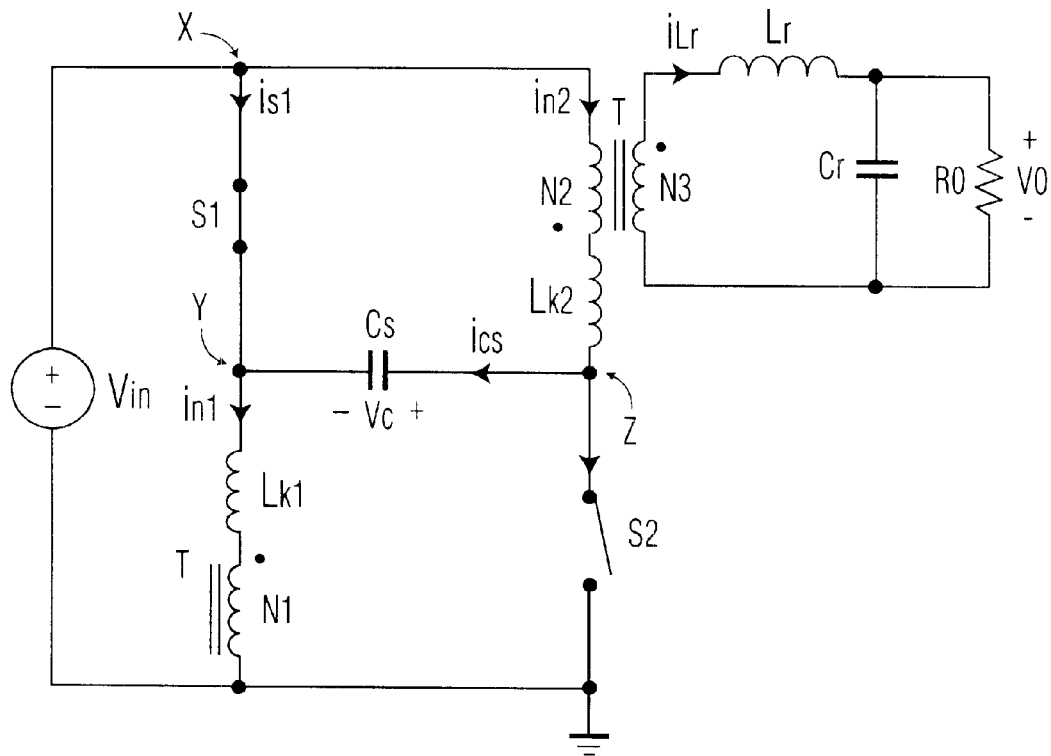

FIG. 5 is the equivalent circuit of FIG. 3 during time period $t_0$ to $t_2$, when $S_1$ is on and $S_2$ is off. (For ease of description, the leakage inductances $L_{k1}$, $L_{k2}$ associated with windings $N_1$ and $N_2$ are omitted from the description of the basic operation of FIG. 5 (and FIG. 6 below); the impact of the leakage inductance at switch off will be considered in further detail below.) As shown in FIG. 5, the input source voltage $V_{in}$ is applied to winding $N_1$. Since winding $N_1$ is coupled to winding $N_2$ the increasing current $i_{n1}$ created by $V_{in}$ induces a voltage and a resulting current $i_{n2}$ in $N_2$. Since the number of windings of $N_1$ and $N_2$ are equal (have a turns ratio of 1:1), the induced voltage across $N_2$ is equal to $(N_2/N_1)*V_{in}$, and thus is equal to $V_{in}$. By the dot convention of $N_1$ and $N_2$, the voltage drop is across $N_2$ in the upward direction in FIG. 5 (i.e., in the direction of point Z to X). Because point X in the circuit has a voltage level $V_{in}$, the voltage at point Z must be $2V_{in}$. Because the voltage at point Y also has voltage level $V_{in}$, the voltage drop from Z to Y is equal to $V_{in}$. Thus, capacitor voltage $V_{cs}=V_{in}$.

Because of the coupling between $N_2$ and $N_1$, current $i_{n2}$ is equivalent to $-i_{n1}$, with a slight DC bias voltage offset due to energy absorbed from $V_{in}$ as shown in waveforms vii and viii of FIG. 4. The current $i_{cs}$ of capacitor $C_s$ must equal the current $i_{n2}$ flowing through $N_2$, as shown in waveforms viii and ix. Thus, from time $t_0$ to $t_1$ the current $i_{cs}$ acts to charge capacitor $C_s$, whereas from time $t_1$ to $t_2$ the current $i_{cs}$ acts to discharge $C_s$.

As noted, the voltage at point Z of the circuit of FIG. 5 is equal to $2V_{in}$. This is also the voltage drop across the open switch $S_2$ in the time interval $t_0$ to $t_2$, as shown in waveform iv of FIG. 5. Focusing again on $t_0$ of FIG. 4, it is seen from waveforms ii and iv that switch $S_2$ does not have the voltage spike when switched from on to off, as in the prior art devices. Instead, waveform iv shows that the voltage across $S_2$ rises directly to a value of $2V_{in}$ and is maintained at that level for the duration $t_0$ to $t_2$. When $S_2$ is turned off at $t_0$, the current $i_{n2}$ flowing in $N_2$ is immediately shunted to the circuit loop that includes capacitor $C_s$, thus immediately charging $C_s$ with the current $i_{n2}$. Thus, any current contributed to $i_{n2}$ by a release of magnetic energy stored in leakage inductor $L_{k2}$ associated with $N_2$ at to acts to charge $C_s$ from $t_0$ to $t_1$. Thus, there is no mechanism in the circuit that creates a voltage spike across $S_2$.

It is again observed that the discharge of capacitor $C_s$ from $t_1$ to $t_2$ creates a negative current in $i_{cs}$ (which is equivalent to $i_{n2}$) as shown in FIG. 5 by the sign convention. The current thus flows counter-clockwise around the loop including $C_s$, $N_2$ and $S_1$, thus contributing (along with the current $i_{n1}$ through $N_1$ created by $V_{in}$) to the relatively large positive current $i_{s1}$ through switch $S_1$ from $t_1$ to $t_2$.

Figure 6:
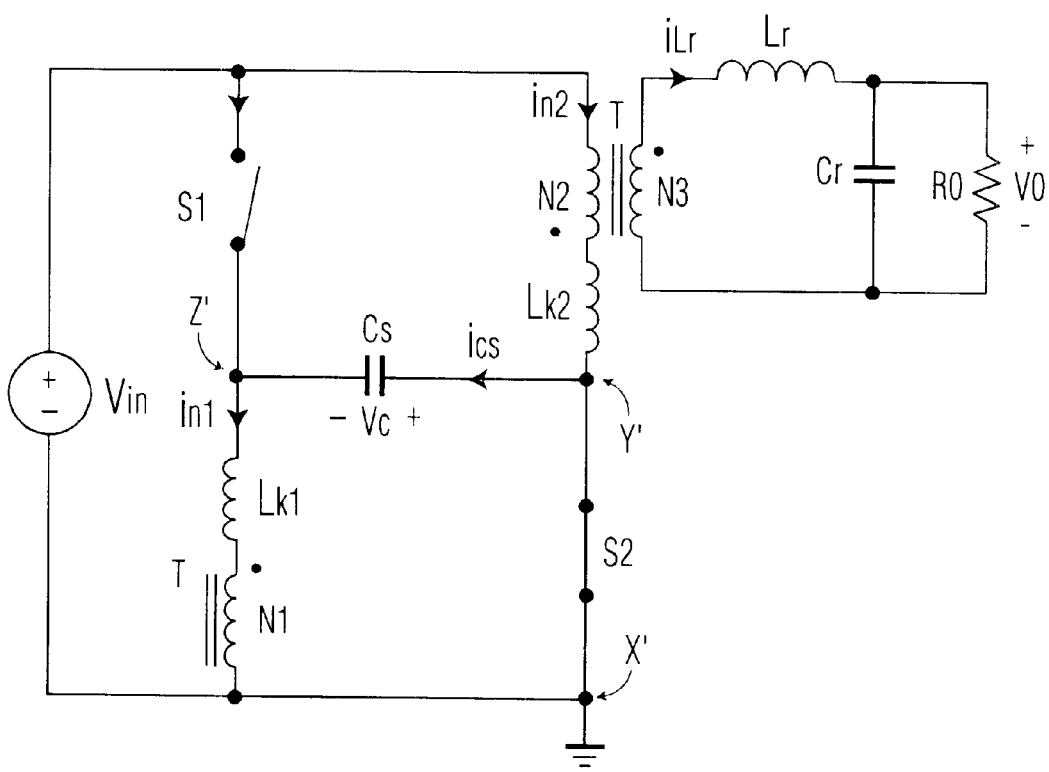

By symmetry, analogous description applies during the portion of the switching cycle when $S_1$ is off and $S_2$ is on during $t_2$ to $t_4$, as shown in FIG. 6. In short, supply voltage $V_{in}$ is applied across $N_2$ (including associated leakage inductor $L_{k2}$). Thus, current $i_{n2}$, which now flows through closed switch $S_2$, begins to build from a negative value at $t_2$ to a positive value at $t_4$. By the coupling of $N_2$ and $N_1$, voltage $V_{in}$ is induced across $N_1$ in the upward direction (by the dot convention). This implies that the voltage at point Z' is $-V_{in}$, $V_C=V_{in}$ and $V_{s1}=V_{in}-(-V_{in})=2V_{in}$, as shown in waveform iii of FIG. 4.

Input voltage $V_{in}$ applied to $N_2$ acts to reverse current $i_{n2}$, as shown in waveform viii of FIG. 4. A closed circuit is also formed by the loop including $C_s$, $N_1$ and $S_2$; thus $i_{n1}$ and $i_{cs}$ are equal from $t_2$ to $t_4$, as shown in waveforms vii and ix of FIG. 4. Currents $i_{n1}$ and $i_{cs}$ are positive from $t_2$ to $t_3$, thus charging capacitor $C_s$ as the current in $N_1$ is reduced. As described above, this shunting of the current to $C_s$ avoids a voltage spike across S at $t_2$. (See waveform iii at $t_2$). The combination of current $i_{n1}$ (or equivalently, $i_{cs}$) and current $i_{n2}$ through switch $S_2$ from $t_2$ to $t_4$ results in a relatively large current through $S_2$ at the end of the cycle $t_4$. (See waveforms vii, ix and vi at $t_2$ to $t_4$.)

Subsequent switching cycles are analogously described. Thus, the inventive circuit avoids the voltage spikes across the switches when a switching off occurs.

The winding currents $i_{n1}$ and $i_{n2}$ through $N_1$ and $N_2$ are always continuous sinusoidal waves as long as the switching frequency is chosen close to the resonant frequency, which is determined by the values of resonant inductor $L_r$ and resonant capacitor $C_r$. In any operation mode, the winding currents are always continuous and the switch voltages are always clamped up to two times the input voltage. Actually, the leakage inductances of transformer T can be used as part of the resonant inductance. In any operation mode, there are two sub circuits operating in parallel. There is no source within the circuit that generates the high voltage spike since the current flowing through windings $N_1$ and $N_2$ is always continuous. The leakage energy is thus recycled.

Given again that the number of windings of $N_1$ equals those of $N_2$, the maximum voltage across switches $S_1$ and $S_2$ is equal to twice the input voltage $V_{in}$. Compared with the conventional push-pull resonant inverter, in the present invention the windings $N_1$ and $N_2$ carry continuous current and work together at all times to produce the resonant tank current $i_{Lr}$, and the voltages across the switches $S_1$ and $S_2$ are always equal to twice the input voltage $V_{in}$. As a result, the present invention has a high efficiency and low voltage stress. And due to the fact that the present invention recycles the leakage inductances, there is no requirement for the leakage inductances of the transformer to be taken into effect during design.

It will be understood that the invention is not limited to a particular type of switching device, and that other switching devices such as bipolar-junction transistors (BJTs) or junction field-effect transistors (JFETs) can be used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An electronic ballast, comprising:
    a DC power source;
    a transformer comprising first, second and third windings, said first, second and third windings being inductively coupled, the third winding being connected in parallel with a load;
    first and second circuit pathways connected in parallel, the first circuit pathway comprising a first switch connected in series with the first winding, and the second circuit pathway comprising the second winding connected in series with a second switch, the DC power source also connected in parallel with the first and second circuit paths to provide an input voltage source;
    a capacitor connecting the point between the first switch and first winding of the first circuit pathway with the point between the second switch and the second winding of the second circuit pathway;
    said first winding effecting charging of the capacitor upon switching off of the first switch and said second winding effecting charging of the capacitor upon switching off of the second switch.

2. The electronic ballast of claim 1, further comprising:
    a first diode connected in parallel with said first switch; and
    a second diode connected in parallel with said second switch.

3. The electronic ballast of claim 1, wherein said load is a resonant circuit comprising a fluorescent lamp.

4. The electronic ballast of claim 3, wherein said resonant circuit is comprised of an inductor in series with a capacitor and said fluorescent lamp, said capacitor and said fluorescent lamp being in parallel with each other.

5. The electronic ballast of claim 1, wherein said first and second switches are transistors.

6. The electronic ballast of claim 5, wherein said transistors is a metal-oxide semiconductor field-effect transistors.

7. The electronic ballast of claim 1, wherein the first switch and the second switch are electrically connected to a controller, the controller providing switching signals to the first and second switches.

8. The electronic ballast of claim 7, wherein the switching signals provided by the controller switches the first and second switches off and on in a repeating cycle, the first switch switched on while the second switch is switched off and the first switch switched off while the second switch is switched on.

9. The electronic ballast of claim 8, wherein the voltage across the first and second switches is substantially constant.

* * * * *